United States Patent [19]
Link

[11] 3,750,787
[45] Aug. 7, 1973

[54] HYDRAULICALLY OPERATED FRICTION CLUTCH

[75] Inventor: Helmut Link, Schanbach, Germany

[73] Assignee: Index-Werke K G Hahn & Tessky, Esslingen, Germany

[22] Filed: Dec. 30, 1971

[21] Appl. No.: 214,294

[30] Foreign Application Priority Data
Jan. 7, 1971 Germany................... P 21 00 572.1

[52] U.S. Cl................................ 192/85 AB, 92/70
[51] Int. Cl............................................ F16d 25/00
[58] Field of Search ...................... 192/85 AB, 88 A

[56] References Cited
UNITED STATES PATENTS

| 2,619,212 | 11/1952 | Cardwell et al.................. 192/88 A |
| 3,407,912 | 10/1968 | Moore ............................. 192/88 A |
| 2,381,941 | 8/1945 | Wellman et al................ 192/88 A X |
| 3,468,402 | 9/1969 | Edwards......................... 192/85 AB |
| 2,361,120 | 10/1944 | Peterson......................... 192/85 AB |
| 3,651,909 | 3/1972 | Zaotaszwili ..................... 192/88 A |
| 1,909,744 | 5/1933 | Berg................................. 192/88 A |
| 1,950,914 | 3/1934 | Blakely........................... 192/85 AB |
| 2,267,650 | 12/1941 | Hale................................. 192/88 A |
| 2,829,750 | 4/1958 | Parrett....................... 192/85 AB X |

FOREIGN PATENTS OR APPLICATIONS
608,090 11/1960 Canada........................... 192/85 AB

*Primary Examiner*—Benjamin W. Wyche
*Attorney*—Michael S. Striker

[57] ABSTRACT

An inner clutch half including two axially movable clutch parts with lateral outer friction faces, is mounted within an outer clutch half which has inner friction faces cooperating with the outer friction faces of the inner clutch half. Fluid pressure in a chamber bounded by the clutch parts of the inner clutch half, forces the clutch part away from each other against the action of springs so that the outer and inner friction faces engage each other and the axial forces in the clutch balance each other.

8 Claims, 1 Drawing Figure

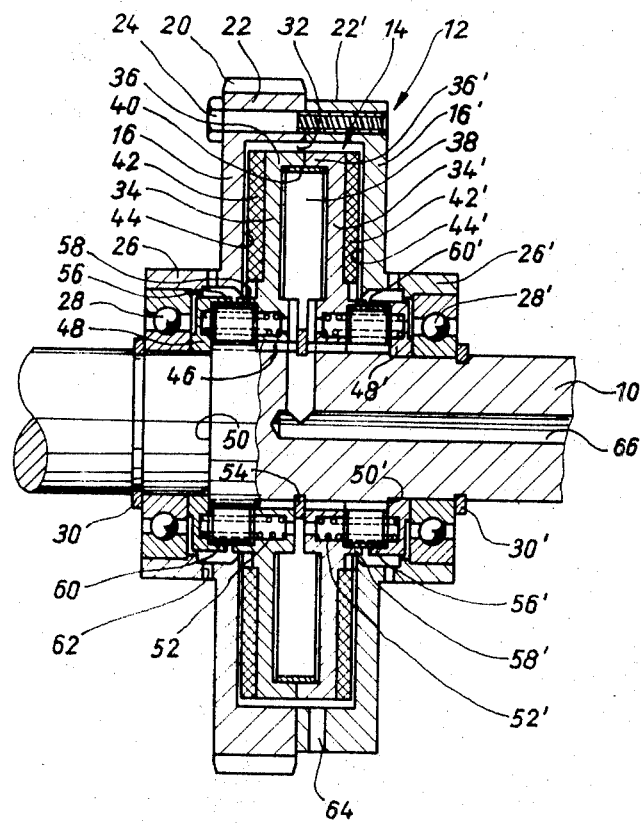

HYDRAULICALLY OPERATED FRICTION CLUTCH

BACKGROUND OF THE INVENTION

The present invention is concerned with a friction clutch which has clutch halves which are axially shiftable between an inoperative position and a coupling position in which the clutch halves are connected for rotation.

Particularly for thread cutting operations, two clutches are used for reversing the direction of rotation of a working spindle. The two clutches are mounted on a drive shaft, and connect the working spindle with the drive shaft for rotation in opposite directions. For this purpose, only mechanically operated frusto-conical clutches have been mainly used, since clutches of this type exert no torque at all when disengaged. Since the relative rotary speed between the two clutch halves may be up to 10,000 rpm, friction clutches with lamellar coupling discs cannot be used since clutches of this type transmit a small residual torque which may cause excessive heating of the clutch. Single disc clutches require such a great diameter, that an excessive moment of inertia occurs, so that upon reversal of the direction of rotation of the working spindle, too much energy, causing heat losses, would be required. Also, the time required for the reversal of the working spindle, would be extremely long.

Although frusto-conical friction clutches have been widely used for a long time for the above explained purpose, there are some disadvantages of this type of clutch. Frequent servicing is required, since the friction wear must be compensated by adjustment of the clutch, in order to avoid continuous slipping and overheating. Such adjustment of a clutch can only be carried out by a skilled mechanic in accordance with his subjective opinion. Furthermore, the adjustment is not continuous, and the setting of the clutch to an exactly selected torque, is not possible. Furthermore, the clutch must be arranged at an easily accessible place in order to facilitate the frequent servicing.

Another disadvantage is that the clutches of this type are temperature depending. The pressing force of the clutch is produced by the elastic deformation of clutch parts and the shifting mechanism. Due to thermal expansion, the transmitted torque varies, which has the disadvantage that the reversal of the direction of rotation of the working spindle is not quite exact, and the length of the threads made by the working spindle varies. Additional heat is developed at the shifting collar where the operating forces of the shifting mechanism are transmitted to the rotating clutch. The pressure forces require a large bearing which can also sustain thrust forces, and which also causes heat development. The mechanical shifting mechanism for the clutch, also obstructs direct heat dissipation.

Finally, conventional frusto-conical friction clutches, are expensive since they require adjusting mechanism and shifting means, which also increase the rotary moment of inertia.

SUMMARY OF THE INVENTION

It is one object of the invention to provide a friction clutch which requires practically no servicing, operates independently of the temperature, and does not require mechanical devices for adjusting or shifting the clutch.

Another object of the invention is a friction clutch of extremely simple construction which is free of bending stresses.

Another object of the invention is to operate a friction clutch hydraulically in such a manner that all axially effective forces balance each other.

With these objects in view, the present invention provides a friction clutch in which one clutch half is formed by two clutch parts which are axially movable relative to each other, and form a chamber for a fluid by which the clutch parts of one clutch half are pressed against the respective other clutch half. A clutch according to the invention has a comparatively small mass since the clutch halves transmit only the load torque without being submitted to bending stresses due to the fact that the effective pressure is directly transmitted in axial direction between the clutch halves. Consequently, the two clutch halves can be constructed as comparatively thin discs.

One embodiment of the invention comprises a hollow outer clutch halve mounted for rotation about the axis of a shaft, and having axially spaced confronting inner friction faces transverse to the axis; an inner clutch half located in the hollow outer clutch half and including two inner clutch parts having outer friction faces, respectively, transverse to the axis and confronting the inner friction faces, respectively.

The two inner clutch parts are non-rotatably mounted on a shaft for axial movement toward each other to an inoperative position, and away from each other to a coupling position in which the outer friction faces abut the inner friction faces so that the inner and outer clutch halves are frictionally coupled.

The inner clutch parts formed between each other a closed and sealed chamber so that pressure fluid in the chamber moves the inner clutch parts to the coupling position.

Biassing means are provided for urging the inner clutch parts toward each other to the inoperative position when the pressure in the chamber is reduced. However, when high pressure fluid is supplied into the chamber, the inner clutch parts move outwardly to the coupling position engaging the friction faces of the outer clutch half, overcoming the force of the biassing means.

Sealing ring means close the chamber between the inner clutch parts, and pressure fluid is supplied into the chamber through an axially extending channel having a port in the outer surface of the shaft communicating with the chamber.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE of the drawing is an axial sectional view illustrating an embodiment of the invention.

DESCRIPTION OF A PREFERRED EMBODIMENT

Referring now to the drawing, a friction clutch is mounted on a shaft 10, and comprises an outer clutch half 12, and an inner clutch half 14 located within the hollow outer clutch half 12.

The outer clutch half 12 is formed by two symmetrical outer clutch parts 16, 16' each of the clutch parts 16, 16' has an annular disc portion and an axially projecting cylindrical peripheral flange 22, 22' whose free circular edges abut each other due to the provision of screw bolts 24. Each outer clutch part 16, 16' has a hub portion 26, 26' in which the outer races of two ball bearings 28, 28' are secured, while the inner races of the ball bearings 28, 28' are mounted on shaft 10 and are secured by spring rings 30, 30' against axial displacement. The outer clutch member 16 of the outer clutch half 12, is provided with a torque transmitting outer gear ring 20 which is, for example, connected by gears, not shown, with a high speed working spindle of an automatic lathe. The torque transmitting means 20 may also be constructed as a pulley.

The two fixedly connected outer clutch parts 16 and 16' form an annular space 32 whose cross-section is substantially rectangular. The inner clutch half 14, whose dimensions are adapted to the shape of the inner space 32, and whose radial cross-section is also substantially rectangular, also includes two symmetrical inner clutch parts 34, 34' provided with peripheral axially projecting flanges 36, 36' whose annular edges or end faces abut each other when the clutch is inoperative and disengaged, as shown in the drawing. Biassing means in the form of springs 52, 52' urge the inner clutch parts 34, 34' in axial direction toward each other, as will be explained hereinafter in greater detail.

The two inner clutch parts 34, 34' define an inner chamber 38 within the inner clutch half 14. Chamber 38 is annular, and can be supplied with pressure fluid through a channel 66 located in the axis of shaft 10 and having a port on the outer surface of shaft 10 communicating with the annular pressure chamber 38 so that when pressure fluid is supplied through channel 66, the inner clutch parts 34, 34' are moved apart so that the outer friction faces of linings 42, 42' which are parts of the inner clutch parts 34, 34', are pressed against the inner friction faces 44, 44' of the outer, fixedly connected clutch parts 16, 16'.

A cylindrical sealing ring 40 abuts the cylindrical inner surfaces of the flanges 36, 36' so that pressure chamber 38 is sealed, even if the flanges 36, 36' separate from each other and form a gap, due to the movement of the inner clutch parts 34, 34' to the coupling position abutting the friction faces 44, 44' of the outer clutch half 12.

In the disengaged inoperative position of the clutch shown in the drawing, the outer friction faces of linings 42, 42' are spaced from the inner friction faces 44, 44' so that no force is transmitted, and no heat develops.

The axial movement of the inner clutch parts 34, 34' toward and away from each other, while the inner clutch half 12 rotates with shaft 10, is obtained by axially extending guide means, such as multiple keys 46 in the peripheral surface of shaft 10. The inner clutch parts 34, 34' have annular center portions which are shaped to be guided by guide means 46 in axial direction, while establishing a rotary drive connection.

Each of the inner clutch parts 34, 34' has an annular flange 58, 58', flanges 58 and 58' projecting in opposite axial directions within the outer coupling half 12 and its hub portions 26, 26'.

Annular flanges 58, 58' respectively cooperate with annular flanges 56, 56' of annular abutment members 48, 48' which are mounted on shaft 10, abutting the inner races of ball bearings 28, 28'. Annular abutment member 48 also abuts circular shoulder 50 on shaft 10. The gaps between flanges 58, 56 and 58', 56', are covered by cylindrical elastic metal sealing rings 60, 60' whose outer diameter is the same as the inner diameters of flanges 58, 58', 56, 56'.

Between the annular abutment members 48, 48', and abutment portions of the inner clutch parts 34, 34', coil springs 52, 52' are mounted angularly spaced about the axis of shaft 10, and circumferentially spaced along the annular abutment members 48, 48'.

Since the annular abutment members 48, 48' cannot move outward in axial direction, spring pressure acts in opposite direction on corresponding annular parts of the annular inner clutch parts 34, 34' to move the same to the illustrated position in which the clutch is disengaged. Fluid pressure supplied through channel 66 and entering the pressure chamber 38, will move the inner clutch parts 34, 34' apart in axial direction against the action of springs 52, 52'.

The innermost abutting position of the inner clutch parts 34, 34' is also determined by an annular abutment ring 54 secured to shaft 10, and located between the annular portions of the inner clutch part 34, 34' on which springs 52, 52' act.

Hub portions 26, 26' are provided with radial bores 62 located within the ball bearings 28, 28'. The axial flange 22' of the outer clutch part 16' of the outer clutch half 12, has corresponding radial bores 64 so that leakage oil entering the space 32 during rotation of the outer clutch half 12, and abraded particles of the friction linings 42, 42' can flow out of space 32.

When the clutch is in the disengaged position illustrated in the drawing, in which the friction linings 42, 42' are spaced from the inner friction faces 44, 44' of the outer clutch half 12, since compression springs 52, 52' bias the inner clutch parts 34, 34' of the inner clutch half 14 into an abutting position.

When the clutch is to be engaged, a pressure medium, particularly oil under pressure, is supplied to the pressure chamber 38 formed between the inner clutch parts 34, 34', the same are moved apart in opposite axial directions against the action of compression springs 52, 52' so that the outer friction faces of linings 42, 42' are rapidly and forcefully thrown against the inner friction faces 44, 44' of the outer clutch half 12 so that clutch half 12 is rotated by means of ball bearings 28, 28' on shaft 10, and about the axis of shaft 10. The clutch remains in the engaged position as long as the pressure in the pressure chamber 38 exceeds the biassing force exerted by springs 52, 52'. The outwardly acting pressure on the outer coupling parts 16, 16' is taken up by the ball bearing 28, 28' and by the screw bolts 24, so that radially extending wall portions of the outer clutch parts 16, 16' can be comparatively thin.

When no pressure fluid is supplied to the pressure chamber 38, the springs 52, 52' return the inner clutch part 34, 34' of the inner clutch half 14 toward each other to the inoperative position in which the friction faces 44, 44' are spaced from the friction faces of the inner clutch half 14. During the inward movement of the inner clutch part 34, 34', some oil is pressed out of chamber 18 until the inner clutch part 34, 34' abuts the annular stop 54, and the free annular edges of the axial flanges 36, 36' abut each other.

Due to the fact that the clutch half 14 is located between the outer clutch parts 16, 16' of the outer clutch half 12, the radial walls of both clutch halves are subjected only to a very small bending force when the inner clutch part 34, 34' are moved to the operative position engaging the friction faces 44, 44'. Consequently, the inner clutch part 34, 34' can be constructed of thin annular discs having a small mass and inertia, and due to the box-shaped construction of the clutch halves, which abut the bearings 28, 28', a fast conduction and dissipation of the heat takes place.

It is also advantageous that, by providing the gear ring 20 on the outer clutch half 12, a torque can be directly transmitted to the outer clutch part 12. The outer end faces of the outer clutch part 12 are advantageous provided with air moving means, such as grooves, fins, or turbine blades for increasing the cooling effect of the air.

The construction of the clutch halves 12, 14 of two clutch parts which are symmetrical to each other has the advantage of a comparatively simple manufacture and assembly.

Due to the fact that the inner clutch parts 34, 34' are non-rotatably, but axially movable, mounted on shaft 10, the inner clutch part 34, 34' can be easily displaced in axial direction, while the transmission of the torque is assured by the keys or the like 46. The abutment rings 48, 48', which are stationarily mounted on shaft 10 and support the ends of the springs 52, 52' assure that immediately after the reduction of the pressure in chamber 38, the friction faces of the inner clutch half 14 are separated from the friction faces of the outer clutch half 12 so that a minimum of undesired heat is generated when the clutch is disengaged.

Due to the provision of the sealing rings 60, 60', the splined or keyed portion of shaft 10 can run in an oil filled space.

Similarly, the provision of the metal sealing ring 40 assures a good sealing of the pressure chamber 38 in the inoperative and coupling positions of the clutch. It is, of course, necessary that the axial width of the elastic cylindrical sealing ring 40 is less than the distance between the inner clutch parts 34, 34' which corresponds to the axial width of pressure chamber 38. The thin cylindrical sealing ring 40 takes up very little space, has a small mass, and can be subjected to high temperatures. Tests have shown that a sealing ring of this type can be used at least for ten million shifting operations of the clutch while assuring a good seal of the pressure chamber 38, paraticularly if sealing ring 60 consists of metal. The above-described sealing rings 60, 65 operate in the same reliable manner, and are also elastic cylindrical metal rings.

In the illustrated preferred embodiment, the outer clutch half 12 has hub portions 26, 26' by which the outer clutch half 12 is supported on shaft 10 for rotation. A particularly simple construction is obtained when the abutment rings 48, 48' abut the inner races of ball bearings 28, 28'.

The supply of pressure oil into chamber 38 through a channel 66 in the shaft 10 results in a very short length of the required conduits.

It will be understood that each of the elements described above, or two or more together, may also find a useful application in other types of hydraulically operated friction clutches differing from the types described above.

While the invention has been illustrated and described as embodied in a clutch having an outer clutch half with two confronting friction faces, and an inner clutch half including two axially movable inner clutch parts with friction faces movable into and out of engagement with the friction faces of the outer clutch part, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. Hydraulically operated friction clutch comprising a shaft means having an axis; a hollow outer clutch half mounted for rotation about said axis, and having axially spaced confronting inner friction faces transverse to said axis; an inner clutch half located in said hollow outer clutch half and including two inner clutch parts having outer friction faces, respectively transverse to said axis and confronting said inner friction faces, respectively, said two inner clutch parts being non-rotatably mounted on said shaft means for axial movement toward each other to an inoperative position, and away from each other to a coupling position in which said outer friction faces abut said inner friction faces, respectively, so that said inner and outer clutch halves are frictionally coupled; said inner clutch parts forming between each other a closed chamber so that pressure fluid in said chamber moves said inner clutch parts to said coupling position; said inner clutch parts having annular flanges surrounding said shaft means; two abutment rings secured to said shaft means axially outward of said flanges of two inner clutch parts, respectively; means for urging said inner clutch parts toward each other to said inoperative position when the pressure in said chamber is reduced; said means for urging including two spring means located between said abutment rings and said inner clutch parts, respectively, for urging said inner clutch parts toward each other to said inoperative position; and an annular sealing member covering each pair of cooperating flanges and abutment rings; said abutment rings and said annular flanges of said inner clutch parts having cylindrical inner surfaces of the same diameter, and confronting circular edges axially spaced from each other in said inoperative positon; and said annular sealing member being a cylindrical elastic sealing ring having an outer cylindrical surface slidingly abutting said cylindrical inner surfaces of said flanges and abutment rings.

2. Friction clutch as claimed in claim 1 wherein said shaft means has peripheral axially extending guide means; wherein said inner clutch parts are annular and have inner end portions fitting into said guide means.

3. Friction clutch as claimed in claim 1 wherein said outer clutch half includes two outer clutch parts having cylindrical peripheral flanges axially projecting toward each other and abutting each other to form a space for said inner clutch half between said outer clutch parts; attaching bolts holding said outer clutch parts in a normal position in which said peripheral flanges abut each other, each of said outer clutch parts having a hub portion; and two ball bearing means between said shaft means and said hub portions, respectively.

4. Friction clutch as claimed in claim 1 wherein said outer clutch half has torque transmitting means so that said outer clutch half, said inner clutch half, and said shaft can be driven by a torque transmitted to said torque transmitting means of said outer clutch half.

5. Friction clutch as claimed in claim 1 wherein said outer clutch half has air moving cooling means on the outer surface thereof.

6. Friction clutch as claimed in claim 1 wherein said shaft means is formed with an axially extending channel having a port in the outer surface of said shaft means communicating with said chamber so that pressure fluid can be supplied through said channel to said chamber for moving said inner clutch parts away from each other to said coupling position.

7. Hydraulically operated friction clutch comprising a shaft means having an axis; a hollow outer clutch half mounted for rotation about said axis, and having axially spaced confronting inner friction faces transverse to said axis; an inner clutch half located in said hollow outer clutch half and including two inner clutch parts having outer friction faces, respectively, transverse to said axis and confronting said inner friction faces, respectively, said two inner clutch parts being non-rotatably mounted on said shaft means for axial movement toward each other to an inoperative position, and away from each other to a coupling position in which said outer friction faces abut said inner friction faces, respectively, so that said inner and outer clutch halves are frictionally coupled; said inner clutch parts forming between each other a closed chamber so that pressure fluid in said chamber moves said inner clutch parts to said coupling position; said inner clutch parts having annular flanges surrounding said shaft means; two abutment rings secured to said shaft means axially outward of said flanges of two inner clutch parts, respectively; means for urging said inner clutch parts toward each other to said inoperative position when the pressure in said chamber is reduced; said means for urging including two spring means located between said abutment rings and said inner clutch parts, respectively, for urging said inner clutch parts toward each other to said inoperative position; and an annular sealing member covering each pair of cooperating flanges and abutment rings; each of said inner clutch parts including an annular disc, and a circular peripheral flange on said disc axially projecting toward the respective other peripheral flange and having a circular edge abutting the corresponding edge of said other peripheral flange in said inoperative position; a cylindrical elastic sealing ring within said peripheral flanges and closing the gap between said circular edges in said coupling position, said sealing ring having a width less than the axial distance between said annular discs; and said chamber being at least partly formed by said discs, peripheral flanges, and said sealing ring.

8. Hydraulically operated friction clutch comprising a shaft means having an axis; a hollow outer clutch half mounted for rotation about said axis, and having axially spaced confronting inner friction faces transverse to said axis; an inner clutch half located in said hollow outer clutch half and including two inner clutch parts having outer friction faces, respectively, transverse to said axis and confronting said inner friction faces, respectively, said two inner clutch parts being non-rotatably mounted on said shaft means for axial movement toward each other to an inoperative position, and away from each other to a coupling position in which said outer friction faces abut said inner friction faces, respectively, so that said inner and outer clutch halves are frictionally coupled; said inner clutch parts forming between each other a closed chamber so that pressure fluid in said chamber moves said inner clutch parts to said coupling position; said inner clutch parts having annular flanges surrounding said shaft means; two abutment rings secured to said shaft means axially outward of said flanges of two inner clutch parts, respectively; means for urging said inner clutch parts toward each other to said inoperative position when the pressure in said chamber is reduced, said abutment rings and said annular flanges of said inner clutch parts having cylindrical inner surfaces with the same diameter, and confronting circular edges axially spaced from each other in said inoperative position; and a cylindrical elastic sealing ring covering each pair of cooperating flanges and abutment rings, and having an outer cylindrical surface slidingly abutting said cylindrical inner surfaces of said flanges and abutment rings.

* * * * *